United States Patent [19]

Sasayama et al.

[11] 4,297,881
[45] Nov. 3, 1981

[54] HOT-WIRE FLOW RATE MEASURING APPARATUS

[75] Inventors: Takao Sasayama, Hitachi; Yutaka Nishimura, Katsuta; Shinichi Sakamoto, Hitachi; Masayuki Miki, Katsuta, all of Japan

[73] Assignee: Hitachi, Ltd., Tokyo, Japan

[21] Appl. No.: 78,468

[22] Filed: Sep. 24, 1979

[30] Foreign Application Priority Data

Sep. 22, 1978 [JP] Japan .................... 53-117051

[51] Int. Cl.³ .................... F02M 51/00; G01F 1/68
[52] U.S. Cl. .................................... 73/204; 73/116
[58] Field of Search .............. 73/204, 116, 189; 123/494, 478, 11.9 R

[56] References Cited

U.S. PATENT DOCUMENTS 3,747,577 7/1973 Mauch et al. .................. 73/202
4,089,214 5/1978 Egami et al. .................. 73/204

FOREIGN PATENT DOCUMENTS 2649040 5/1978 Fed. Rep. of Germany ........ 73/204
570332 8/1977 U.S.S.R. .................................... 73/204

Primary Examiner—Donald O. Woodiel
Attorney, Agent, or Firm—Craig and Antonelli

[57] ABSTRACT

A hot-wire flow rate measuring apparatus comprises a series circuit including a first thermo-sensitive resistive element placed in the fluid path of a fluid and a first resistive element, a circuit for dividing the voltage across the first thermo-sensitive resistive element, a second thermo-sensitive resistor for temperature compensation placed in the fluid path of fluid, means for detecting the difference between the output voltage of the voltage dividing circuit and the output voltage of the second thermo-sensitive resistor for temperature compensation. Current fed to the series circuit is controlled in accordance with the detected voltage from the detecting means, and the output means is provided for producing a voltage in accordance with the voltage across the resistive element, wherein the output voltage of the output means indicates a flow rate of fluid.

39 Claims, 16 Drawing Figures

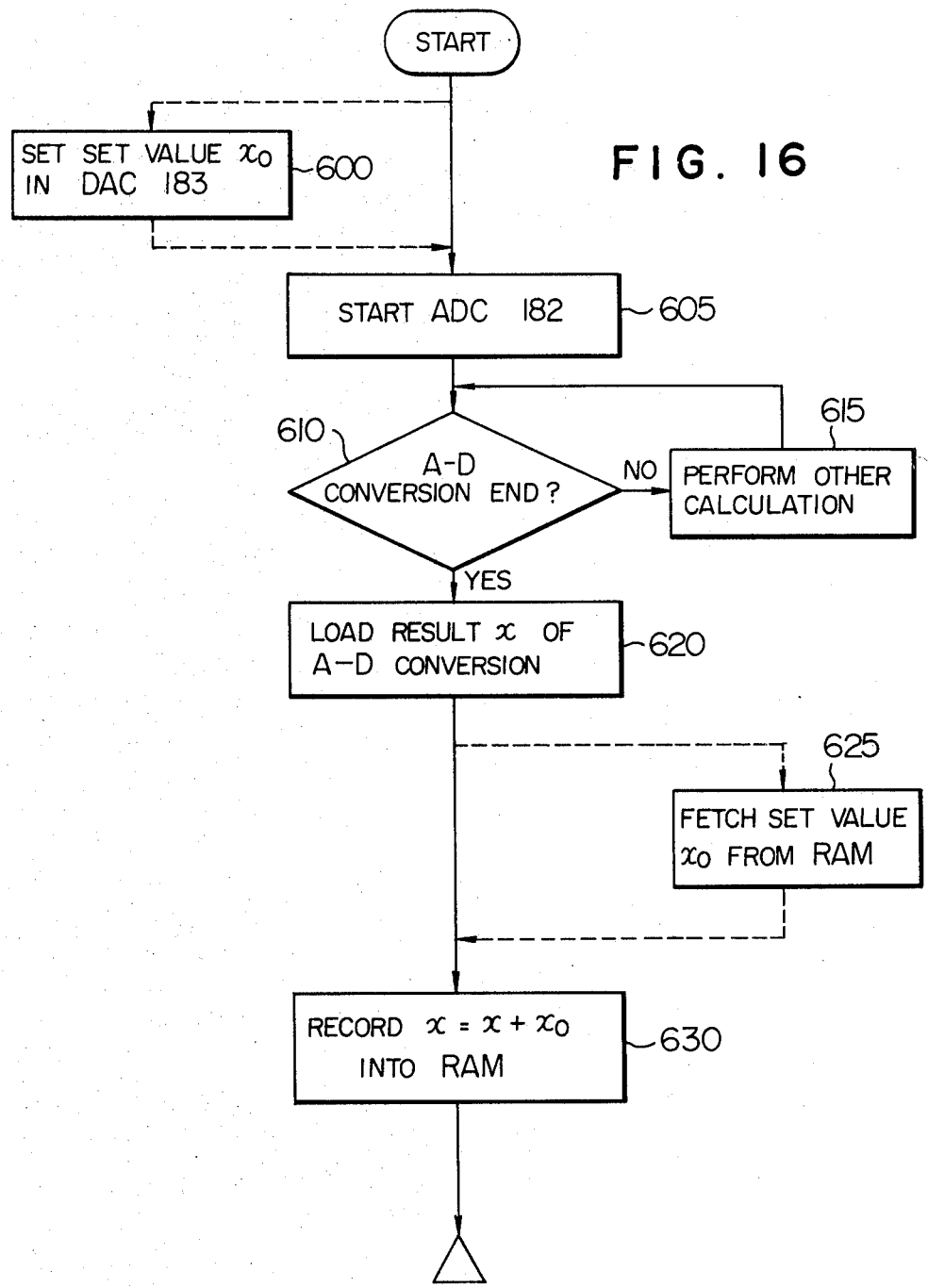

HOT-WIRE FLOW RATE MEASURING APPARATUS

The present invention relates to a hot-wire flow rate measuring apparatus and, more particularly, to a circuit arrangement with a good temperature compensation.

A known and commonly used flow rate measurement technique, called a hot-wire flow rate measurement, employs a thermo-sensitive resistive element placed in a flow path of a fluid, the flow rate of fluid per unit time being electrically measured depending on a relationship between the heating value of the thermo-sensitive resistor and the flow rate of fluid.

A conventional hot-wire flow rate measuring apparatus is roughly classified into a fixed temperature type apparatus and a fixed temperature difference type apparatus, and typical examples of the same are disclosed in U.S. Pat. No. 3,747,577 by H. MAUCH et al, for example.

The fixed temperature type apparatus is provided with an amplifier and a bridge circuit including a single thermo-sensitive resistive element placed in the flow path of the fluid. The bridge circuit is provided with first diagonal points and second diagonal points. The amplifier is connected at its input to the first diagonal points and at the output to its second diagonal points. The amplifier controls a voltage applied to the bridge circuit so that the bridge circuit is always kept in a balanced condition. By this control, a current flowing through the thermo-sensitive element is controlled in accordance with a flow rate of fluid and the temperature of the thermo-sensitive resistive element is kept constant. Accordingly the, flow rate obtained is a function of the current flowing through the thermo-sensitive resistive element. This type measuring of apparatus is effective when the temperature of the fluid is fixed, but the measured value must be compensated, when the temperature changes, in accordance with the changed value of temperature.

The fixed temperature difference type measuring apparatus successfully eliminates such a disadvantage. In this type of apparatus, a first thermo-sensitive resistive element for flow rate measurement placed in the flow path of the fluid is inserted in a first branch of a bridge circuit and a second thermo-sensitive resistive element for temperature compensation is inserted in a second branch connected in series with the first branch. Two inputs of an amplifier are connected in parallel with a series arrangement of the first and second thermo-sensitive elements. With this circuit arrangement, the temperature change in the fluid is detected by the second thermo-sensitive element for temperature compensation placed in the fluid path and the control is effected so that the difference between the surface temperature of the first thermo-sensitive resistive element and the surface temperature of the second thermo-sensitive resistive element, i.e. the temperature of the fluid, is always kept constant.

The heating value of the first thermo-sensitive resistive element in the fluid and the heating value carried away by the fluid are related as follows:

$$Q = I^2 R_H = \left( C1 + C2 \sqrt{q_{am}} \right) \Delta T$$

where Q is the heating value of the thermo-sensitive resistive element, $R_H$ the resistance of the first thermo-sensitive resistive element, C1 and C2 are constants, $q_{am}$ is the mass air flow rate per unit of time, and $\Delta T$ is the difference between the surface temperature of the first thermo-sensitive resistive elemet and the temperature of the fluid. Accordingly, when the temperature difference $\Delta T$ is fixed, the flow rate detected is a function of the current flowing through the first thermo-sensitive resistive element.

In the circuit construction, the same voltages are applied to the respective first and second branches. In order to improve the sensitivity of the flow rate detection, the current flowing through the first thermo-sensitive resistive element must be larger than that flowing through the second thermo-sensitive resistive element. Particularly, when the flow rate measuring apparatus is used in an automobile or the like, the voltage of the battery power source is low, for example, 12 V and thus the current flowing therethrough is small. In this point, the just-mentioned requirement is intensive. Further, when the heating of the second thermo-sensitive resistive element is high, the detection accuracy of the fluid temperature is degraded. This necessitates reducing the current flowing through the second thermo-sensitive resistive element to as small a value as possible. For this, the resistance of the second branch must be larger than that of the first branch. In other words, the resistance of the second thermo-sensitive resistive element must be larger than that of the first thermo-sensitive resistive element. The first and second thermo-sensitive resistive elements have equal temperature coefficients and are made of the same material such as platinum. Accordingly, to make larger the resistance of the thermo-sensitive resistive element larger, the platinum resistive wire must be narrowed. However, it is very difficult to narrow the platinum resistive wire so as to have the same diameter throughout and so the wire formed suffers from non-uniform resistivity over its entire length. In order to compensate for such uneven resistivities of the second of the thermo-sensitive resistive elements due to the non-uniform resistivity of the wire, it is necessary to adjust the resistances of other resistors in the bridge circuit. The adjustment is very troublesome, thus resulting in poor reproducibility of the apparatus. Additionally, two kinds of resistors must be prepared as the first and second thermo-sensitive resistors, thus leading also to deterioraton of the reproducibility.

Accordingly, an object of the invention is to eliminate such disadvantages of the conventional measuring apparatuses.

Another object of the invention is to provide a hot-wire flow rate measuring apparatus which has a high sensitivity for a flow rate change, and good temperature compensation for a temperature change of the fluid.

A major feature of the invention resides in a series arrangement with a thermo-sensitive resistor for measurement placed in the fluid path and a resistor, and the difference between the divided voltage across the thermo-sensitive resistive element for measurement and than voltage across the thermo-sensitive resistive element for temperature compensation placed in the fluid is obtained, and the current fed to the series arrangement is controlled on the basis of the difference of the voltage.

Other objects and features of the invention will be apparent from the following description taken in connection with the accompanying drawings, in which:

FIG. 16 shows a flow chart to obtain a flow rate value by using the circuit shown in FIG. 15.

Figure 1:
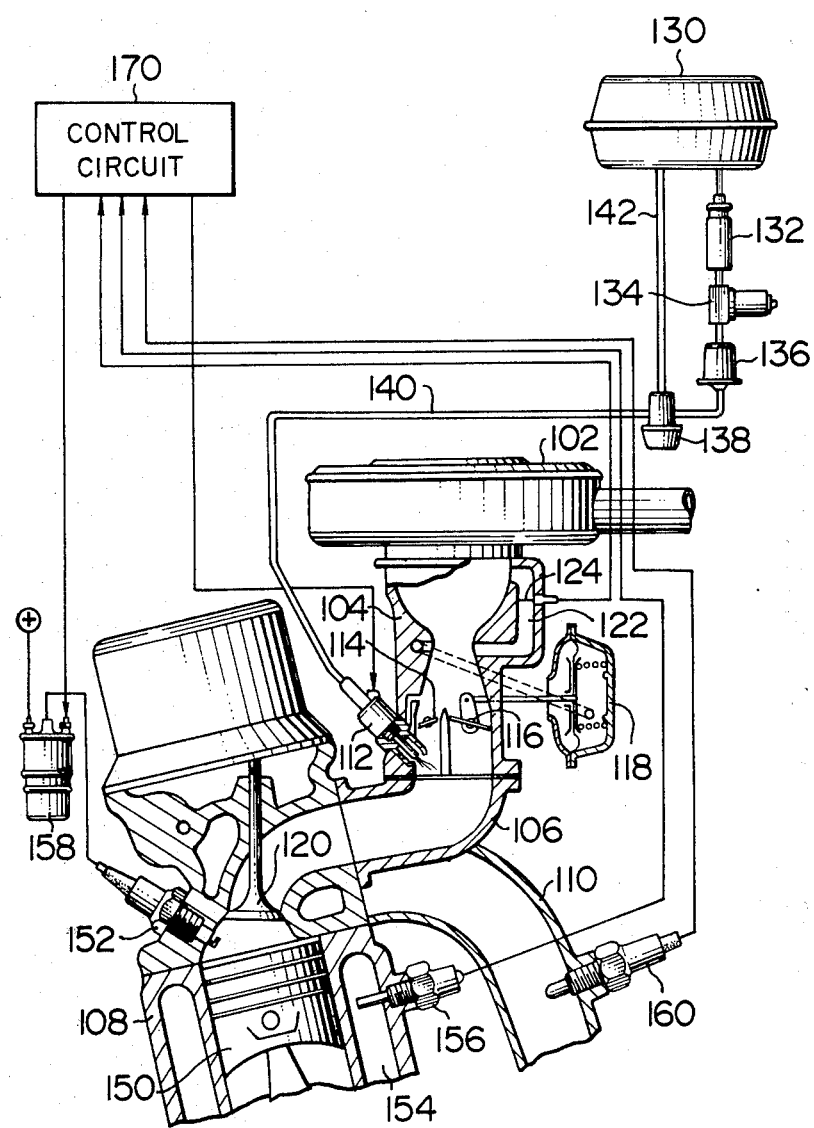
FIG. 1 shows a cross sectional view of an internal combustion engine which is a typical application of the invention.

Before proceeding with the description of the present invention, a typical example to which a hot-wire flow rate measuring apparatus according to the invention is applied will be described with reference to FIGS. 1 to 4. FIG. 1 shows a cross sectional view of an internal combustion engine and its related peripheral portions to which the flow rate measuring apparatus according to the invention is applied as a device to measure a flow rate of an intake air flow for the internal combustion engine of an automobile, for example. Intake air is fed to a cylinder 108, through an air cleaner 102, a throttle chamber 104, and an intake pipe 106. Gases burned in the cylinder 108 are exhausted into the atmosphere through an exhaust pipe 110. A fuel injector 112 for injecting fuel is provided in the throttle chamber 104. Fuel ejected from the injector is atomized in an air path of the throttle chamber 104 and is mixed with intake air to be a fuel-air mixture. The mixture is supplied to the combustion chamber of the cylinder 108 through the intake pipe when an intake valve 120 is open. Throttle valves 114 and 116 are provided in the vicinity of the outlet of the injector 112. The throttle valve 114 is mechanically coupled with an accelerator pedal and is driven by an operator or driver. The throttle valve 116 is coupled with a diaphragm 118 in driving relation. The throttle 116 is fully closed in a small region of the air flow rate in the throttle chamber 104. As the air flow rate increases, a pressure applied to the diaphragm 118 increases so that the throttle valve 116 begins to open to suppress an increase of an air suction resistance applied to the throttle 116. An air path 122 is provided upstream of the throttle valves 114 and 116 of the throttle chamber 104. An electrical heater, or a thermo-sensitive resistor 124, which is a part of a hot-wire air flow meter according to the invention, is placed in the air path 122. The hot-wire air flow meter produces the electrical signal changing with an air flow rate in accordance with a relation between an air flow rate and a heating value of the thermal-sensitive resistor. Since the thermal-sensitive resistor 124 is provided in the air path 122, it is protected from high temperature gases at the time of a back-fire and from contamination by dust or the like in air. The outlet of the air path 122 is open near the narrowest portion of the venturi while the outlet is open upstream of the venturi.

Fuel supplied to the injector 112 is derived from a fuel pressure regulator 138 to which a fuel tank 130 supplies fuel by way of a route including a fuel pump 132, a fuel dumper 134, and a filter 136. The fuel pressure regulator 138 supplies pressured fuel through a pipe 140 to the injector. A return pipe 142 returns fuel from the fuel pressure regulator 138 to the fuel tank 130 so that the difference between the pressure in the intake pipe into which the injector injects fuel and the fuel pressure to the injector 112 is always kept constant.

The air fuel-mixture taken in through the intake valve 120 is compressed by a piston 150 and burned by a spark generated from a spark plug 152 to be converted into kinetic energy. The cylinder 108 is cooled by cooling water 154 of which the temperature is measured by a heat sensor 156. An ignition coil 158 applies a high voltage to the spark plug 152 at the timing of ignition.

The gases burned in the cylinder 108 are exhausted through an exhaust valve (not shown) and an exhaust pipe 110 to the exterior. A λ sensor 160 for sensing the state of exhaust gas and the exhaust gas temperature sensor (not shown) are placed in the exhaust gas pipe 110.

Further provided are crank angle sensors (not shown) producing a reference angle signal and a position signal every reference crank angle and a fixed crank angle, for example, 0.5° in accordance with a rotation of the engine respectively. The output signals from those sensors are applied to a control circuit 170 where they are properly processed. The output signals from the control circuit 170 drive the injector 112 and the ignition coil 158.

Figure 2:
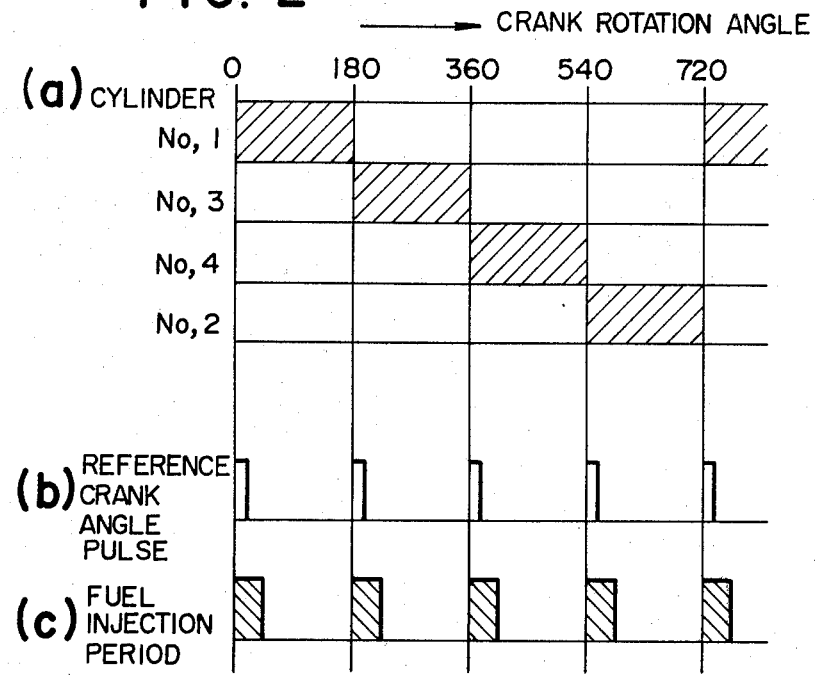
FIG. 2 shows a set of timing charts useful in explaining the operation of the internal combustion engine shown in FIG. 1.

FIG. 2 shows fuel injection timings of the fuel injection from the injector 112 in a four-stroke-cycle engine. In the figure, the abscissa represents the rotational angle of the crank shaft of the engine. In FIG. 2(a), intake strokes of the respective cylinders are indicated by cross-hatching. As seen from the figure, the intake stroke takes place every 180°: the first cylinder for 0° to 180°, the third cylinder for 180° to 360°, the fourth cylinder for 360° to 540°, the second cylinder for 540° to 720°.

As shown in FIG. 2(b), a reference crank angle pulse is produced every 180°. Upon production of this pulse, the injector 112 is open and its opening time is determined by the result of the operation conducted by the control circuit 170 on the basis of the already measured data. The fuel injection periods, i.e., the opening periods of the injector 112, are shown in FIG. 2(c).

Figure 3:
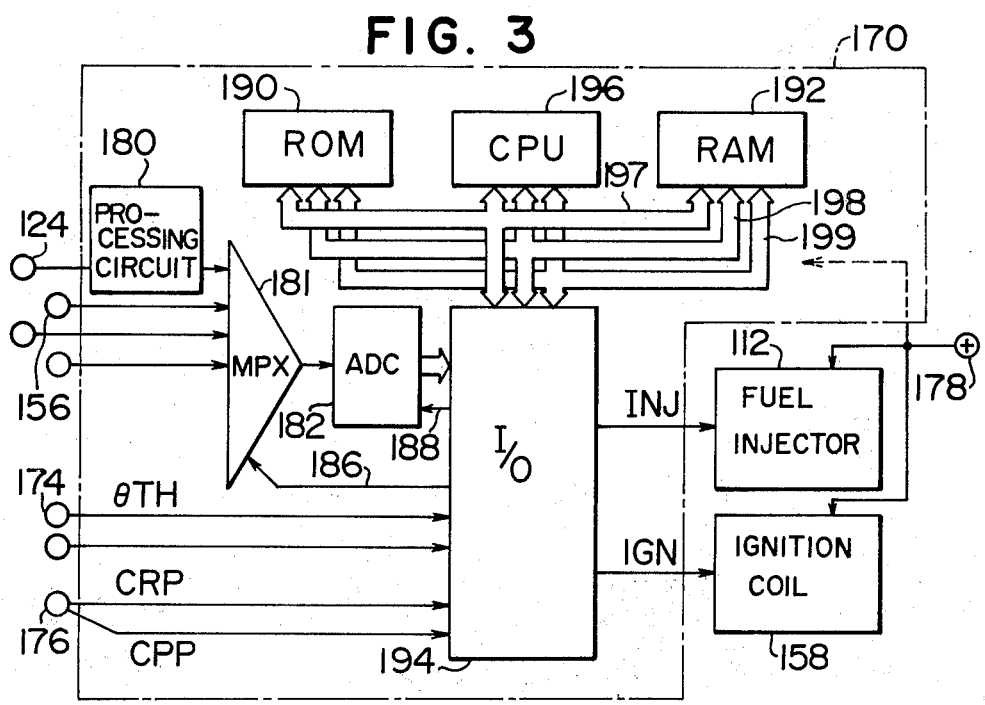
FIG. 3 shows a circuit diagram of an electronic control unit for the internal combustion engine shown in FIG. 1.

The details of the control circuit 170 are shown in FIG. 3. The input signals to the control circuit 170 are roughly classified into three kinds of signals. The first kind of signal includes analog input signals derived from the sensor 124 for detecting an amount of intake air, the sensor 156 for detecting the engine cooling water, and the like. Of those analog input signals, the signal derived from the sensor 124 is processed in a processing circuit 180 and applied to the multiplexer 181. The remaining input signals are directly applied to the multiplexer 181 (MPX) where the output signals from the respective sensors are selected in time-division fashion, and then applied to an analog to digital converter (ADC) 182 where it is subjected to an analog to digital conversion. The second kind of signals include information signals inputted in the form of an on/off signal. One of these signals is a signal θTH representing the fully closed state of the throttle valve, for example, and is transmitted from a switch 174 interlocked with the throttle valve. Those signals may be each treated as one bit digital signal. The third kind of signals include input signals in the form of a train of pulses, such as the reference crank angle signal (CRP) and the position pulse signal (CPP). Those signals are derived from the crank angle sensor 176. The CRP is produced every 180° of the crank angle for a four-stroke-cycle engine, every 120° for a six-stroke-cycle engine, and every 90° for an eight-stroke-cycle engine. The CCP is produced for each 0.5° of the crank angle, for example.

A CPU 196 is a central processing unit for performing a digital operation, a ROM 190 stores a control program and fixed data, and a RAM 192 is a memory permitting read and write operations of information. An input/output interface circuit 194 receives signals from the ADC 182 and the sensors 174 and 176 and transmits signals to the CPU 196. Further, the I/O circuit 194 receives signals from the CPU 196 and transmits them as an injection signal INJ and an ignition signal IGN to the injector 112 and the ignition coil 158 respectively. The ROM, the CPU and the RAM are connected to one another by a control bus 197, a data bus 198 and an address bus 199. Although not shown, a power source supplies the necessary power to those circuit elements or components of the control circuit. Each of the injectors 112 and the ignition coils 158 are provided with an electromagnetic coil for driving the valve and a primary coil for storing electromagnetic energy, respectively. Those coils are connected at one of the ends thereof to a power source terminal 178 and at the other of the ends thereof to the I/O interface circuit 194. With connection, currents flowing into the injectors 112 and the ignition coils 158 are controlled.

Figure 4:
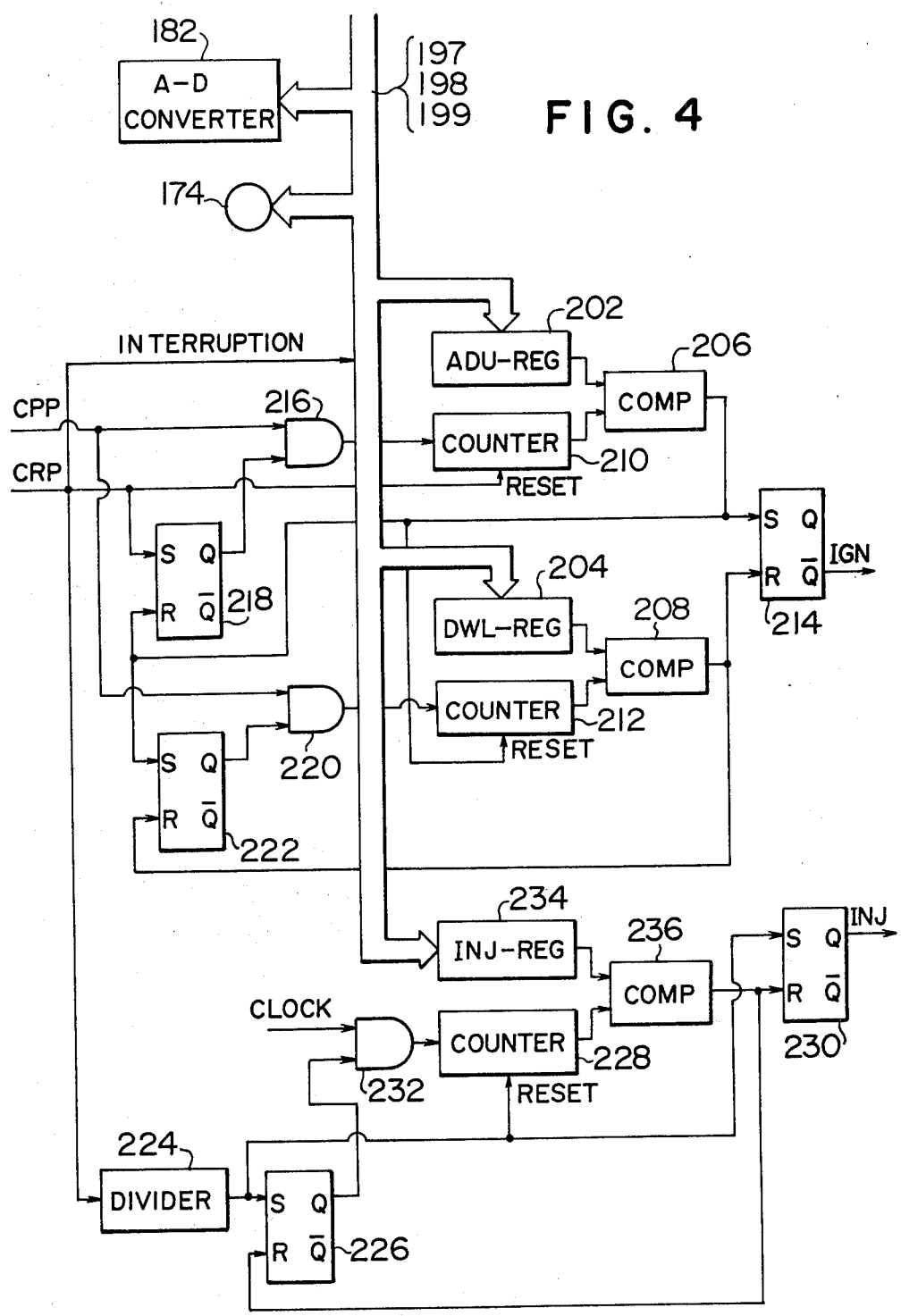
FIG. 4 shows a circuit diagram of an I/O interface used in the circuit shown in FIG. 3.

FIG. 4 shows a block diagram of a circuit relating to the control of the I/O interface circuit 194. The ignition timing data obtained by operating the analog data AF, TW and the like in the CPU 196 is set in a register 202 (referred to as ADC register). The ignition timing data and the current conduction start timing data of the primary current in the ignition coil as well are operated in the CPU and are set in a register 204 (referred to as DWL register). An output signal from the ADC register 202 is supplied to a comparator 206 and an output signal from the DWL register 204 is supplied to a comparator 208. The comparator 206 produces an output pulse when the count value of a counter 210 reaches the present value set in the register 202. The comparator 208 produces an output pulse when the count value of a second counter 212 reaches the preset value set in the register 204. The comparator 206 produces an ignition timing pulse and the comparator 208 produces a current conduction start timing pulse. In response to the output signals from the comparators 206 and 208, an RS flip-flop 214 produces '1' and '0' signals alternately. An ignition signal IGN derived from the $\overline{Q}$ output of the flip-flop 204 drives the ignition coil. The first counter 210 counts the position pulse signal CPP coming through an AND gate 216. The AND gate 216 is enabled by an Q output signal from an RS flip-flop 218 set by the reference crank angle signal CRP. The first counter 210 is reset by the reference crank angle signal CRP and the RS flip-flop 218 is reset by an output signal from the comparator 206. At the moment when a reset state of the RS flip-flop 218 caused by the output of the comprator 206 is transferred to a set state of the same caused by the reference crank angle signal CRP, the AND gate 216 is enabled and the first counter 210 continues its counting of the position pulse signal CPP until its contents coincide with the contents of the ADC register 202 thereby producing the output signal from the comparator 206.

The second counter register 212 also counts the position pulse signal CPP through an AND gate 220. In this case, the condition enabling the AND gate 220 is different from that of the AND gate 216. To be more specific, the AND gate 220 is enabled by the Q output of an RS flip-flop 222 when it is set by an output signal from the comparator 206. The RS flip-flop 222 is reset by the output signal of the comparator 208. Accordingly, the second counter 212 counts the position pulse signal CPP until its contents coincide with the contents set in the DWL register 204, after the comparator 206 produces an output signal. When the count of the counter 212 coincides with the preset value set in the DWL register 204, the comparator 208 produces an output signal which in turn causes the logical level '0' of the signal IGN, which has been set by an output signal from the comparator 206, to be logical '1'. At this time, the primary current of the ignition coil starts to flow.

The pulse signal CRP produced every 180° of the crank angle is frequency divided into ½ by a frequency divider 224. Therefore, the divider 224 produces an output signal every rotation of 360° of crank angle. The output pulse of the frequency divider 224 is applied to the set terminal of an RS flip-flop 226 and the reset terminal of a counter 228, and the set terminal of an RS flip-flop 230. The Q output signal of the RS flip-flop 230 is produced as a fuel injection signal INJ to drive the fuel injector for fuel injection. When the output pulse of the frequency divider 224 is applied to the RS flip-flop 226 so that is produces a Q output signal which in turn enables an AND gate 232 to permit a clock signal to pass therethrough to the counter 228. At this time, the counter 228 is reset by an output pulse of the frequency divider 224. The clock signal is produced by an oscillator (not shown). Fuel injection data is set in a register 234 (INJ register). An output signal from the INJ register is applied to a comparator 236. The counter 228 counts the clock signal coming through the AND gate 232 and transfers its contents to the comparator 236. When the count value of the counter 228 coincides with the set value in the INJ register 234, the comparaor 236 produces an output signal which in turn is applied to the reset terminal of the RS flip-flop 230 and then the INJ signal becomes logical '0' to stop the fuel injection.

Figure 5:
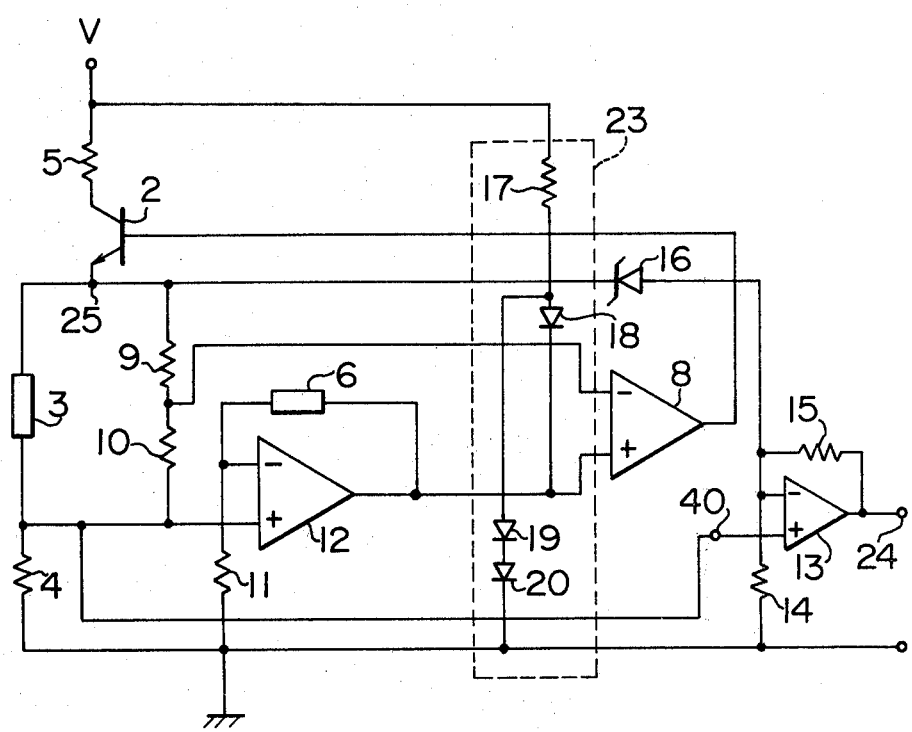
FIG. 5 shows a circuit diagram of a first embodiment of the hot-wire flow rate measuring apparatus according to the invention.

A hot-wire air flow rate measuring apparatus according to the invention will be described hereinafter. Throughout the drawings referred to in the following description, like reference symbols are used to designate like or equivalent portions. FIG. 5 shows a circuit diagram of a first embodiment of the hot-wire flow rate measuring apparatus according to the invention. Reference numeral 3 designates a thermo-sensitive resistor for measurement (corresponding to 124 in FIG. 4) placed in the flow path of fluid, or the path 122 in FIG. 1, and is connected in series with a resistor 4. A series circuit having resistors 9 and 10, connected in parallel with the thermo-sensitive resistor 3, forms a voltage dividing circuit for dividing a voltage across the resistor 3. Reference numeral 6 designates a thermo-sensitive resistor for temperature compensation placed in the air path 122 shown in FIG. 1, or the flow path of the fluid, is connected in series with a resistor 11. The node between the resistors 3 and 4 is connected to the non-inverted input terminal of an amplifier, for example, a operational amplifier 12. The node between the resistors 6 and 11 is connected to the inverted input terminal of the amplifier 12. The thermo-sensitive resistor 6 is inserted between the inverted input terminal and the output terminal of the amplifier 12. The output of the operational amplifier 12 is connected to the non-inverted input terminal of an amplifier, for example, an operational amplifier 8 of which the inverted input terminal is connected to the node between the resistors 9 and 10. An output of the operational amplifier 8 is applied as a bias voltage to a current control element, for example, the base of a transistor 2. The collector of the transistor 2 is connected through a resistor 5 to a DC power source (not shown) providing a voltage V. The emitter of the transistor 2 is connected to a node 25 between the resistor 9 and the resistor 3. A series circuit having a resistor 17 and a diode 18 coupled between the DC power source and the non-inverted input terminal of the operational amplifier 8, and a series circuit having diodes 19 and 20 coupled between the anode of the diode 18 and ground cooperatively form a start circuit 23. In response to the turning on of the power source, the start circuit 23 starts the measuring apparatus. The operation of the start circuit will be described later in detail. The non-inverted input terminal of the operational amplifier 12 is connected to the non-inverted input terminal of an amplifier such as an operational amplifier 13. The inverted input terminal of the operational amplifier 13 is connected through a resistor 14 to ground. A feedback resistor 15 is connected between the inverted input terminal of the operational amplifier 13 and the output thereof. Between the emitter of the transistor 2 and the inverted input terminal of the operational amplifier 13, a constant voltage element, for example, a Zener diode, is connected.

In the circuit shown in FIG. 5, the circuitry except for the thermo-sensitive resistors 3 and 6 corresponds to the processing circuit 180 shown in FIG. 3. The thermo-sensitive resistors 3 and 6 are made of the same material, for example, platinum, with a temperature coefficient α. The thermo-sensitive resistor 6 is placed in the flow path of fluid to detect temperature of the fluid.

The operation of the start circuit 23 is as follows. When the power source is turned on, the amplifier 8 is forced to temporarily produce an output signal and, in turn, to turn on the transistor 2 to thereby actuate the circuit shown in FIG. 5. When the power source is not turned on, the transistor 2 is in the OFF state and the output signals from the operational amplifiers 8 and 12 are zero. When the power source is turned on, the power source voltage V is applied to the collector of the transistor 2 and the circuit 23. Since the diodes 19 and 20 have each a forward voltage drop $V_d$, the anode potential of the diode 18 becomes $2 V_d$, so that the potential at the non-inverted input of the operational amplifier 8 becomes $1 V_d$ since the forward voltage drop of the diode 18 is $V_d$. At this time, the potential of the inverted input terminal of the amplifier 8 is 0, so that the output signal from the operational amplifier 8 is high in level and the transistor 2 becomes conductive. When the circuit including the thermo-sensitive resistors 3 and 6 becomes balanced, the voltages at the inverted and the non-inverted input terminals of the operational amplifier 8 are both higher than the forward voltage drop $V_d$ across the diode, so that the diode 18 is inversely biased and the start circuit 23 is electrically disconnected from the operational amplifier 8.

When a PNP transistor is used in place of the NPN transistor 2 shown in FIG. 5, the cathode of the diode 18 should be connected to the inverted input of the operational amplifier 8 in place of the non-inverted input thereof.

Upon conduction of the transistor 2 triggered by the start circuit, the emitter current of the transistor 2 flows into the series circuit having the resistors 3 and 4 and into the voltage divider including resistors 9 and 10. Assume now that the resistances of the resistors 3, 4, 6, 9, 10 and 11 are respectively denoted as R3, R4, R6, R9, R10 and R11, the voltage drop across the resistor 4 as V4 and the voltage drop across the resistor 3 as V3. The operational amplifier 12 compares the input potentials at the inverted and the non-inverted input terminals, that is to say, the potential at the node between the resistors 3 and 4 and the potential at the node between the resistors 6 and 11, and controls its output potential so that those input potentials are equal to each other. The output potential of the operational amplifier 12 becomes $V4+R6/R11 \times V4$. The operational amplifier 8 controls the base voltage of the transistor 2 so that the potential at the node between the resistors 9 and 10, or the divided voltage across the resistor 3 $\{V4+R10 \times V3/(R9+R10)\}$, and the potential at the output of the operational amplifier 12 are equal to each other. Note here that the amplifier 8 does not effect the control so as to make the voltage across the resistor 3 equal to that across the resistor 6, but compares the divided voltage across the thermo-sensitive resistor 3 with the voltage across the thermo-sensitive resistor 6 and effects the control so as to make those voltages equal to each other. Consequently, the voltage across the resistor 6 may be selected to be much smaller than that across the resistor 3. The output of the FIG. 5 circuit when a balanced condition is kept is obtained as follows. Assume now that the sum of the resistances of the resistors 9 and 10 is selected to be much larger than the resistance value of the thermo-sensitive resistor 3. The resistances of the thermo-sensitive resistors 3 and 6 are given $$R3 = R30(1+\alpha T3) \quad (1)$$

$$R6+R60(1+\alpha T6) \quad (2)$$

where
R30: resistance of the resistor 3 at a reference temperature
R60: resistance of the resistor 6 at a reference temperature
T3: surface temperature of the resistor 3

T6: surface temperature of the resistor 6.

The condition for balancing the circuit of FIG. 4 is given $$R4 \times R6 = k \times R11 \times R3 \tag{3}$$

where $k = R10/(R9 + R10)$.

Substituting the equations (1) and (2) into the equation (3), we have $$T3 - T6 = \Delta T = 1/\alpha \times (1 + k \times R11 \cdot R30/R4 \cdot R60)(-1 + \alpha T3) \tag{4}$$

The relation between the heating value of the thermo-sensitive resistor placed in the fluid and that carried away with the fluid are related as follows:

$$Q = I^2 R3 = \left( C1 + C2 \sqrt{q_{am}} \right) \cdot \Delta T \tag{5}$$

Where

I: current flowing through the resistor 3,
C1 and C2: constants
$q_{am}$: mass air flow rate
Q: heating value of the thermo-sensitive resistor 3

From the equations (1) and (5), we have $$Q = I^2 R30 (1 + \alpha T3) = \left( C1 + C2 \sqrt{q_{am}} \right) \Delta T \tag{6}$$

From the equations (4) and (6), we also have $$Q = I^2 R30 (1 + \alpha T3) \tag{7}$$

$$= 1/\alpha \times \left( C1 + C2 \sqrt{q_{am}} \right) (1 - k \times R11 \cdot R30/R4 \cdot R60) \times (1 + \alpha T3)$$

Therefore, $$I^2 = 1/R30 \times \tag{8}$$

$$\left( C1 + C2 \sqrt{q_{am}} \right) (1 - k \times R11 \cdot R30/R4 \cdot R60)$$

$$= k \left( C1 + C2 \sqrt{q_{am}} \right)$$

where $k = 1/R30 \times (1 - k \times R11 \cdot R30/R4 \cdot R60) =$ constant. As seen from the equation (4), the temperature difference $\Delta T$ is a function of only T3 and therefore there is no need to adjust the values of the circuit components. Such a temperature difference $\Delta T$ satisfies the equation (8), so that the current flowing through the thermo-sensitive resistor 3 is a function including only the air flow rate $q_{am}$. Accordingly, in the balanced condition of the circuit, the currents flowing through the thermo-resistor 3 and the resistor 4 are equal to each other. Therefore, the flow rate of fluid is obtainable by measuring the voltage across the resistor R4. In other words, the voltage across the resistor 4 in the embodiment is produced through the operational amplifier 13. Since the resistors 14 and 15 are so selected that the amplification factor of the operational amplifier 13 is 1, the voltage Eo at the output terminal 24 of the operational amplifier 13 is as follows.

$$Eo = IR4 = R4 \sqrt{k \left( C1 + C2 \sqrt{q_{am}} \right)} \tag{9}$$

The equation (9) indicates that the voltage Eo is a function of the flow rate. Therefore, $q_{am}$ is a function of the voltage Eo. The ratio of the voltages V3 to V6 across the thermo-sensitive resistors 3 and 6 is $$V3/V6 = R3 \cdot R11/R6 \cdot R4 \tag{10}$$

When the resistances of the thermo-sensitive resistors 3 and 6 are equal to each other, the ratio is $$V3/V6 = R11/R4 \tag{11}$$

The equation (11) implies that, if the resistance of the resistor 11 is selected to be considerably larger than that of the resistor 4, the voltage applied to the thermo-sensitive resistor 6 may be selected to be far smaller than that applied to the thermo-sensitive resistor 3. Therefore, the thermo-sensitive resistor 6 is not heated by itself, so that the temperature of the fluid may be measured with a high accuracy, and thus the correct temperature compensation for a fluid temperature variation is ensured. Furthermore, since the current flowing through the thermo-sensitive resistor 3 is permitted to be set large, the sensitivity for the air flow rate is good, so that, when the circuit shown in FIG. 5 is mounted on an automobile, good sensitivity is secured although the voltage of the battery is low, 12 V. Moreover, e.g. less than since the circuit according to the invention permits the same resistors to be used for the thermo-sensitive resistors, the accuracy of the measurement is improved, together with its economical efficiency and the productivity.

The operation of the Zener diode 16 follows. When the circuit in FIG. 5 operates in a normal condition, the voltage across the series circuit including the thermo-sensitive resistor 3 and the resistor 4, i.e. the potential at the terminal 25, and the terminal voltage across the resistor 4, i.e. the potential at the non-inverted input terminal of the operational amplifier 12, change proportionally to each other. When the thermo-sensitive resistor 3 is disconnected or the transistor 2 is conductive, however, the proportionality of the voltage change is altered, and a large current flows into the resistors 9, 10 and 4 and the voltage across the resistor 4 also increases. At this time, the potential at the terminal 25 rises to the break-over voltage of the Zener diode 16, so that the Zener diode conducts, and the potential at the inverted input terminal of the operational amplifier 13 increases. As a result, the output voltage of the operational amplifier decreases and it indicates that the air flow rate is zero or approximates zero. Therefore, erroneous fuel injection is prevented, that is to say, the fuel injector 112 erroneously ejects an excessive amount of fuel, and that an excessive current flows into the thermo-sensitive resistor 3 to be excessively heated, being attended with accident such as fire.

Figure 6:
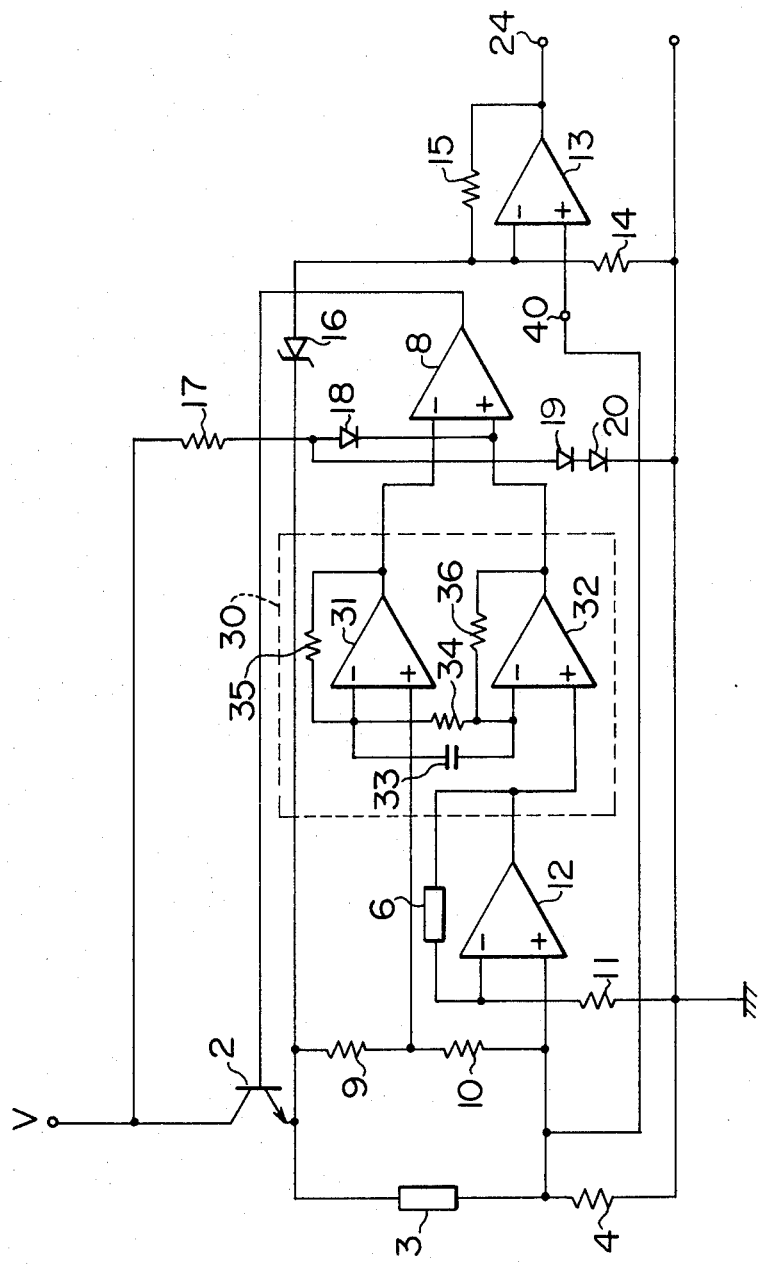
FIG. 6 shows a circuit diagram of a second embodiment of the measuring apparatus according to the invention.

FIG. 6 shows a circuit diagram of a second embodiment of a hot-wire flow rate measuring apparatus according to the invention. This embodiment further includes a high response circuit denoted as 30 having a pair of amplifiers such as operational amplifiers 31 and 32. The operational amplifier 31 is connected at its non-inverted input terminal to a node between the resistors 9 and 10 and at its output to the inverted input of the operational amplifier 8. A resistor 35 is connected between the inverted input and the output of the amplifier 31. The operational amplifier 32 is connected at its non-inverted input terminal to the output terminal of the operational amplifier 12, and at its output terminal to the non-inverted input terminal of the operational amplifier 8, and at its inverted input terminal to the inverted input terminal of the operational amplifier 31, by way of a parallel circuit having a capacitor 33 and a resistor 34. A resistor 36 is inserted between the output of the amplifier 32 and the inverted input terminal thereof.

Assume now that the circuit including the thermosensitive resistors 3 and 6 is in a balanced condition and the voltages across the resistors 3 and 4 are denoted as e3 and e4. The potential $e_a$ at the connection point between the resistors 9 and 10 and an output potential $e_b$ at the operational amplifier 12 are given $$e_a = e4 + e4 \times R6/R11 \tag{12}$$

$$e_b = e4 + ke3 \tag{13}$$

where k is a constant.

In the circuit in FIG. 5, the voltages $e_a$ and $e_b$ are directly applied to the operational amplifier 8. For this, the amplifier 8 produces an output voltage $e_o$ given by $$e_o = G\Delta e = G(e_a - e_b) = G(e4 + e4 \times R6/R11) - G(e4 + ke3) = G(e4 \times R6/R11 - ke3) \tag{14}$$

where G is the gain of the operational amplifier 8. In the circuit shown in FIG. 5, the signals at the input terminals of the operational amplifier 8 include a common voltage component e4 and therefore most of the signal components of the input signal processed by the operational amplifier 8 are occupied by G·e4.

In the circuit construction shown in FIG. 6, the high voltage signals $e_a$ and $e_b$ are applied to the high response circuit 30. Accordingly, the amplifiers 31 and 32 produce respectively output voltages $e'_a$ and $e'_b$ given by $$e'_a = (R36/R34) \times (R6/R11) \times e4 \tag{15}$$

$$e'_b = (R35/R34) \times k \cdot e3 \tag{16}$$

where R34 to R36 are resistances of the resistors 34 to 36. Accordingly, the in-phase signal components e4 are set off against each other. Accordingly, the operational amplifier 8 receiving the signals $e'_a$ and $e'_b$ processes only an erroneous signal as an input signal so that the circuit in FIG. 6 has an increased gain when compared with the circuit of FIG. 5, and thus the response speed to a flow rate change is increased. The capacitor 33 instantaneously increases the gains of the operational amplifiers 31 and 32 by temporarily short-circuiting the resistor 34 when the input voltages $e_a$ and $e_b$ change. With the provision of the capacitor 33, the follow-up performance for a flow rate change is improved.

Explanation will be given of how the control circuit shown in FIG. 3 processes the output voltage Eo representing the flow rate derived from the output terminal 24 of the apparatus shown in FIG. 5 or 6. The output terminal 24 of the circuit shown in FIG. 5 or 6 is connected to the input terminal of the multiplexer 181 shown in FIG. 3, and the flow rate of air is calculated by the control circuit 170.

Figure 7:
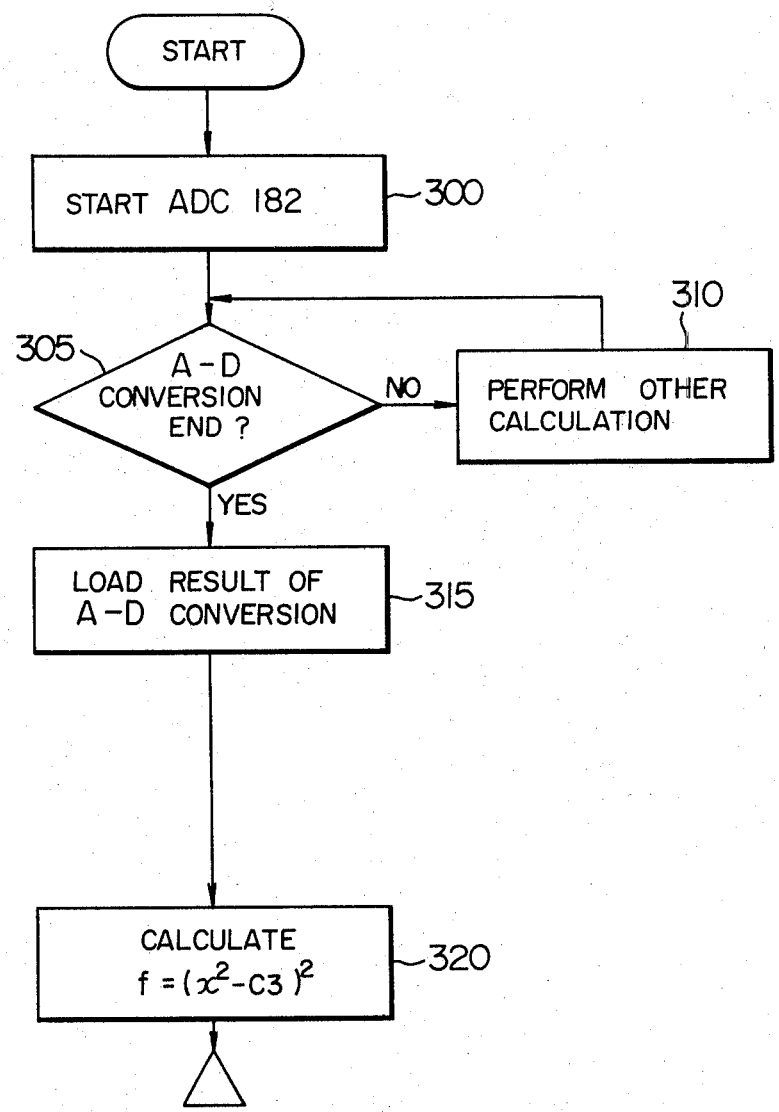
FIG. 7 shows a flow chart to illustrate a processing method of output voltages of the embodiments shown in FIGS. 5 and 6.

In FIG. 7, there is shown a typical flow chart to directly calculate the value f of the flow rate by the control circuit 170 on the basis of the data produced from the output terminal 24 in accordance with a program stored in the ROM 190.

As seen from the equation (9), the flow rate $q_{am}$ is a function of the output voltage Eo derived from the terminal 24.

$$q_{am} = 1/c_2{}^2 \times (E_o{}^2/k \cdot R_4{}^2 - C1)^2 = 1/C_2{}^2 \times (E_o{}^2 - C3)^2 \tag{17}$$

where K' and C3 are constants. As seen from the above equation, by calculating $(E_o{}^2 - C3)^2$, the value corresponding to a flow rate may be obtained. At a step 300 of the program, the CPU 196 enables the input gate for the processing circuit 180 of the multiplexer 181 through the I/O interface 194 and the line 186, so that the output voltage Eo of the processing circuit 180 is applied to the ADC 182 and then the ADC 182 is driven through the line 188. The ADC 182 converts the analog data Eo into digital data. At a step 305, a check is made whether a flag representing the completion of the analog-to-digital conversion by the ADC 182 is set in the I/O interface. When the analog-to-digital conversion is not yet completed, other data processing is performed at a step 310. When it is completed, at a step 315, the result x of the AD conversion is loaded in the I/O interface. At the next step 320, the value f corresponding to a flow rate, $f = (x^2 - C3)^2$ is calculated on the basis of the data C3 set in the ROM 190 and the data x inputted.

In the above-mentioned method, the flow rate is calculated for every component of input data x. However, there is an alternation in which a plurality of input data samples $x_1, \ldots x_n$ are previously set up, the converted data (set values of the flow rate) corresponding to those samples are calculated and stored in the ROM 190, and the flow rate value f for the input data x is approximately calculated on the basis of the flow rate set values stored in the ROM.

Figure 8:
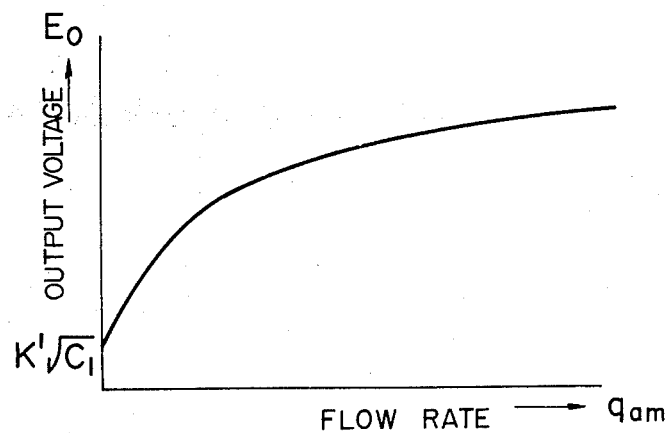
FIG. 8 shows a graph illustrating output characteristics of the first and the second embodiments.

A change of the output voltage Eo with respect to the flow rate $q_{am}$ is a function of $q_{am}$ and is diagrammatically illustrated in FIG. 8. As is seen from FIG. 8, the rate of change of the output voltage Eo is smaller, as the flow rate $q_{am}$ increases. Accordingly, when the flow rate is calculated by using the equation (9) on the basis of the output data Eo, the error becomes larger as the flow rate increases. Incidentally, it is possible to linearize the measured output data with respect to the flow rate $q_{am}$.

When the flow rate of intake air of an automobile is measured, it is necessary to average the air flow rate taken in the intake stroke. However, the flow rate vibrates in a complicated manner. Therefore, the flow rate is calculated by using the output data Eo as it is in accordance with the equation (9), an error occurs. If the measured output data is linearized with respect to the flow rate, the flow rate is accurately detected.

Figure 9:
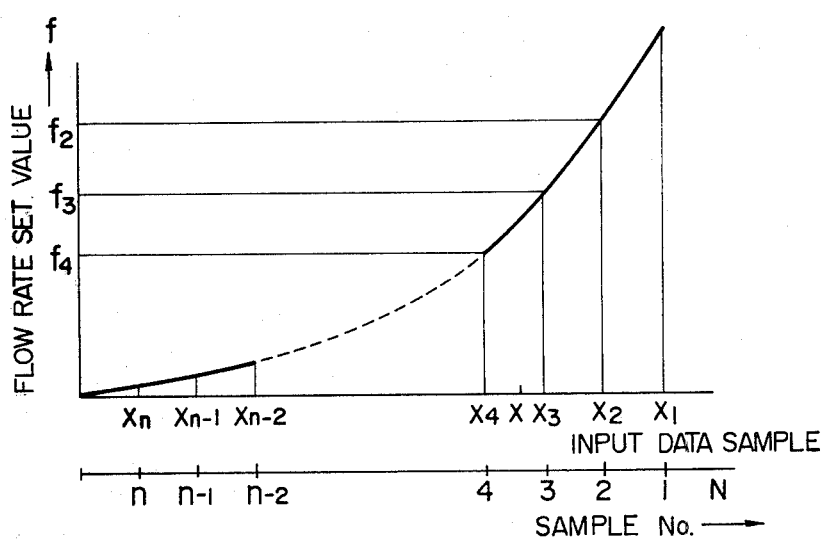
FIG. 9 shows a graph illustrating flow rate values corresponding to the output data of the circuits in FIGS. 5 and 6.
Figure 10:
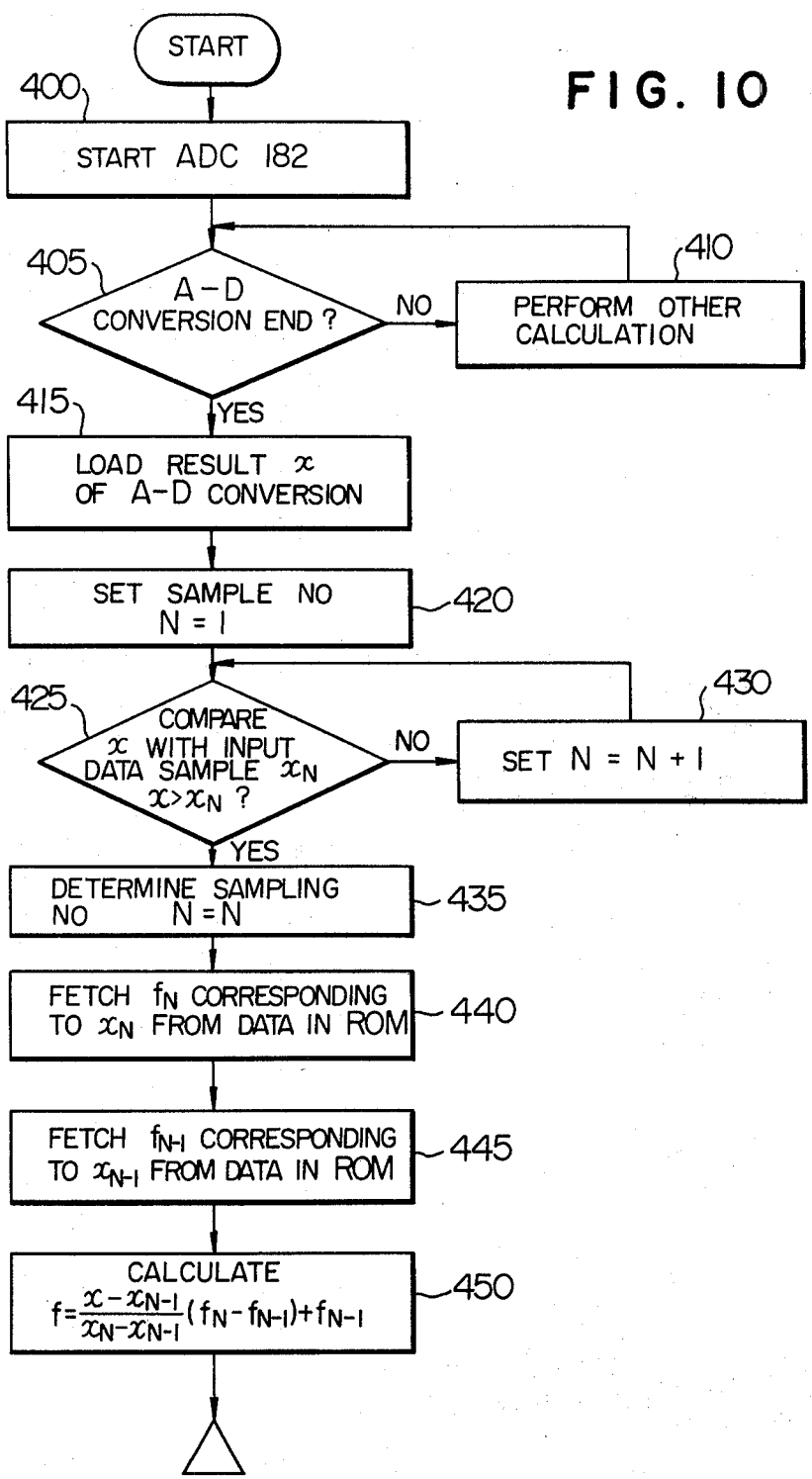
FIG. 10 shows a flow chart for illustrating another processing method of the output voltages from the embodiments shown in FIGS. 5 and 6.
Figure 11:
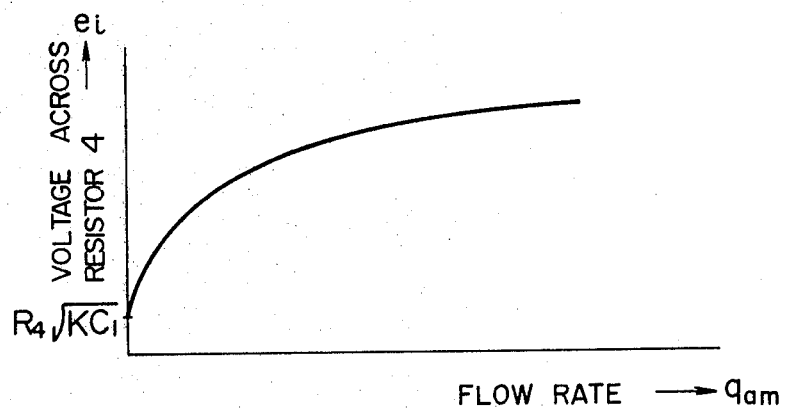
FIG. 11 shows a graph illustrating input characteristics of output amplifiers shown in FIGS. 5 and 6.

A flow rate calculating method illustrated by the flow chart shown in FIG. 10 is known as a table look-up method. In this method, flow rate set values f1, ... fn which are linearly related to the actual flow rate $q_{am}$, with respect to input data samples $x_1, \ldots x_n$ are previously calculated, and those are stored in the ROM. Then, it is determined to what range of input data samples $x_1$ to $x_n$ the input data x from the ADC 182 belongs for an approximate calculation. More specifically, the flow rate set values $f_1$ to $f_n$, which are linearly related to the flow rate $q_{am}$, for the input data samples $x_1, \ldots x_n$ (corresponding to the analog-to-digital converted values of the output voltage Eo) are previously calculated and stored in the ROM, as shown in FIG. 9. A processing method of the table look-up will be described by using a flow chart shown in FIG. 10.

Steps 400 to 415 are the same as the steps 300 to 315 shown in FIG. 7 and therefore an explanation of these will be omitted. In a step 420, the sampling No. 1, i.e. N=1, is set in the RAM 192. In a step 425, an input data sample $x_1$ corresponding to N=1 is compared with the input data x inputted in the step 415 and it is determined if $x > x_1$ or not. If $x \leq x_1$, the program proceeds to a step 430 where N is set to be the sum of the present value and 1, i.e. N=2. At a step 425, the input data sampling value $x_2$ is compared with the input data x. The steps 425 and 430 are repeated until the condition $x > x_N$ is satisfied. From this, it is found that $x_{N-1} > x > x_N$. The next step 435 determines the sampling number to be N to satisfy the condition $x_{N-1} > x > x_N$. In the example of FIG. 9, the input data x is between the sampling values $x_3$ and $x_4$ so that the sampling number N is determined to be 4, N=4. A step 440 fetches this flow rate set value $f_N$ corresponding to the input data sample value $x_N$ from the ROM. Similarly, at a step 445, a flow rate set value $f_{N-1}$ corresponding to the input data sample value $x_{N-1}$ from the ROM is taken out from the ROM. At the step 450, a flow rate f is determined in accordance with the following equation stored in the ROM on the basis of the flow rate set values $f_N$ and $f_{N-1}$, the input data x and the input data sample values $x_N$ and $x_{N-1}$.

$$f = (x - x_{N-1})/(x_N - x_{N-1}) \times (f_N - f_{N-1}) + f_{N-1} \quad (18)$$

Since the equation (18) is a linear interpolation, the number of input data sampling values and the number of the flow rate set values must be such to an accuracy necessary for linear interpolation. The flow rate f thus obtained is linearly related to the actual flow rate $q_{am}$ and is accurate.

Current I flowing through the resistor 4 in the embodiment shown in FIG. 5 or FIG. 6 is given from the equation (8) as follows:

$$I = \sqrt{k\left(C1 + C2\sqrt{q_{am}}\right)} \quad (19)$$

Accordingly, a voltage $e_i$ applied to the non-inverted input terminal of the operational amplifier 13 is $$e_i = IR4 = R4\sqrt{k\left(C1 + C2\sqrt{q_{am}}\right)} \quad (20)$$

Figure 12:
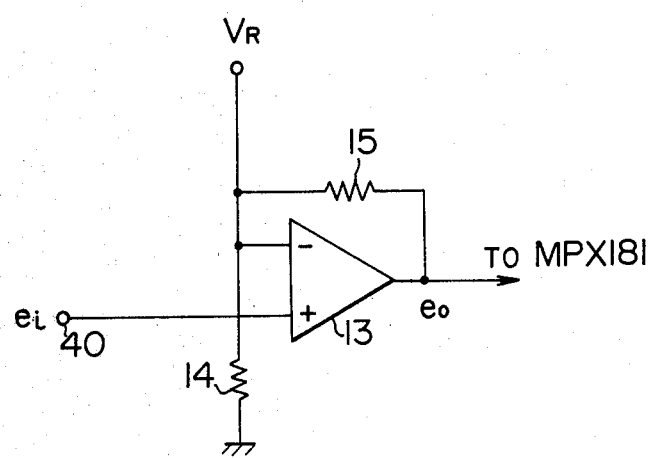
FIG. 12 shows a typical circuit diagram of an output compensation circuit useful in the present invention.

Accordingly, even if the flow rate $q_{am}$ is zero, the voltage $e_i$ is expressed by $e_i = R4\sqrt{kC1}$ and the voltage at the non-inverted input terminal of the operational amplifier 13 is restricted in its dynamic range for the flow rate $q_{am}$ of the operational amplifier 13 since a fixed voltage is supplied even if the flow rate is 0. Further, since $e_o = R4\sqrt{k(C1 + C2\sqrt{q_{am}})}$ from the equation (9) even if the flow rate is zero, the operational amplifier 13 produces $e_o = R4\sqrt{kC1}$, so that the dynamic range of the ADC 182 is also restricted. Therefore, as shown in FIG. 12, by applying a voltage $V_R$ to the inverted input terminal of the operational amplifier 13, the output $e_o$ of the amplifier is reduced by $V_R$, compared to the situation that the voltage $V_R$ is not applied thereto. That is to say, $e_o = e_i - V_R$. All one does is to set the power source voltage $V_R$ so that the voltage $e_o$ is small when the flow rate is zero, i.e. $e_i = R4\sqrt{kC1}$.

Figure 13:
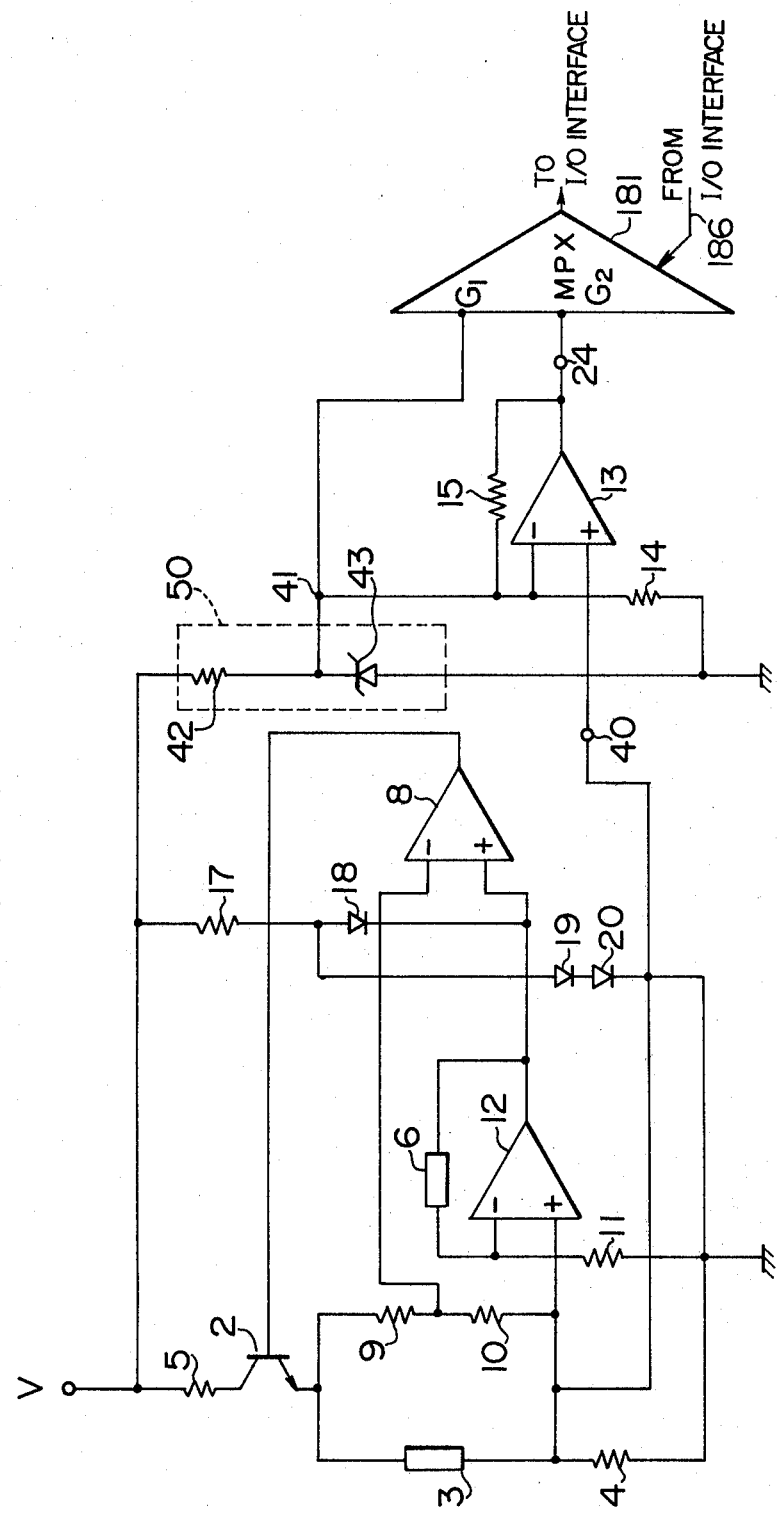
FIG. 13 shows a circuit diagram of a first example of the output compensating circuit.

FIG. 13 shows a hot-wire flow rate measuring apparatus including an output compensating circuit 50 having a series circuit with a resistor 42 and a constant voltage element, for example, a Zener diode 45. The circuit in FIG. 13 is constructed on the basis of the above-mentioned concept. Further, the circuit of FIG. 13 has a construction when the voltage across the Zener diode 43, i.e. the voltage at the terminal 41, is unknown. The voltage at the terminal 41 is set by a series circuit of the resistor 42 connecting to the DC power source V and the Zener diode 43. The set voltage is applied to the inverted input terminal of the operational amplifier 13. The voltage $V_R$ is read in through the MPX 181; thereafter the voltage $V_R$ is added to the output data $e_o$ of the operational amplifier 13 thereby obtaining a compensated value of the output data and the flow rate value is determined from the compensated value.

Figure 14:
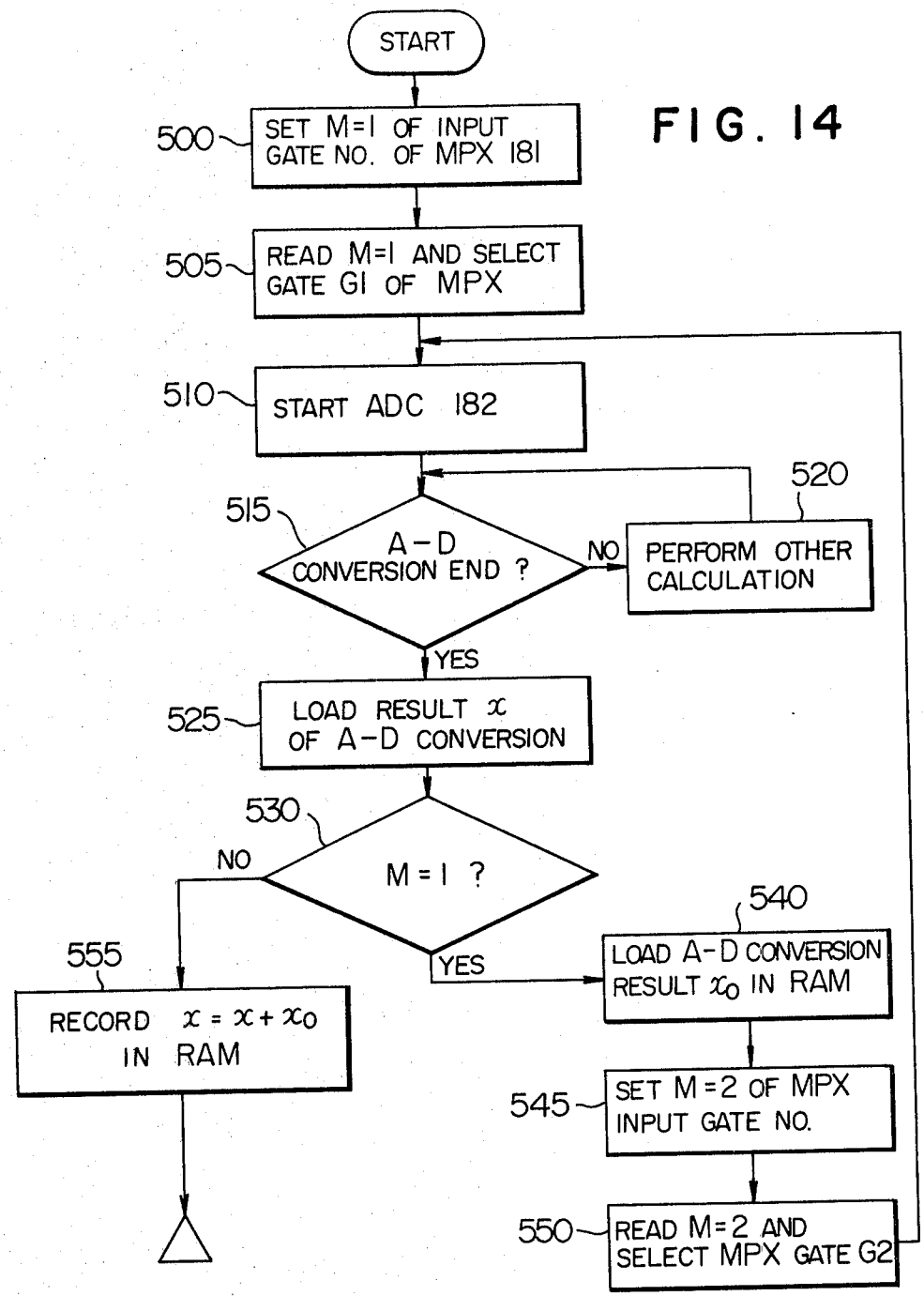
FIG. 14 shows a flow chart to obtain a flow rate value by using the circuit shown in FIG. 13.

A flow chart to execute such an operation is illustrated in FIG. 14. At first, at a step 500, the input gate No. M of the MPX 181 is set to be 1 and sets M=1 in a designated address of the MPX. At a step 505, with M=1 of the input gate No. of MPX, a gate selection signal is coupled through the line 186 to the MPX 181 to thereby enable an input gate G1, and a voltage $V_R$ at the terminal 41 is applied to the ADC 182. At a step 510, the ADC 182 is driven to convert an analog voltage $V_R$ into a digital voltage. At a step 515, a determination is made whether a flag indicating the completion of the analog-to-digital conversion is set or not in the I/O interface. If the A-D conversion is not yet completed, another calculation is performed at a step 520. If it is completed, the program advances to a step 525. In this step, the result $x_o$ of the A-D conversion of the voltage $V_R$ from the ADC 182 is loaded into the I/O interface. At the step 530, a determination is made as to whether the gate No. M of the MPX is 1 or not. If M=1, the program advances to a step 540 where the data $x_o$ loaded at the step 525 is stored in the RAM. At a step 545, the MPX input gate No. M is set to 2, i.e. M=2. Then, at a step 550, M=2 is read and the gate G2 is open to permit an output voltage of the operational amplifier 13 to pass therethrough to the ADC 182. Steps 510 to 525 calculate the A-D converted value x of the output volage $e_o$ and load it into the I/O interface. At a step 530, a determination is made as to whether the input gate No. M is 1 or not. As mentioned above, M is now 2. The CPU performs a step 555. In this step, data $x_o$ stored in the RAM is read out, the data $x_o$ is added to output data x and the sum, $x = x + x_o$, is stored in the RAM.

The flow rate is calculated on the result of the addition, $x = x + x_o$.

Figure 15:
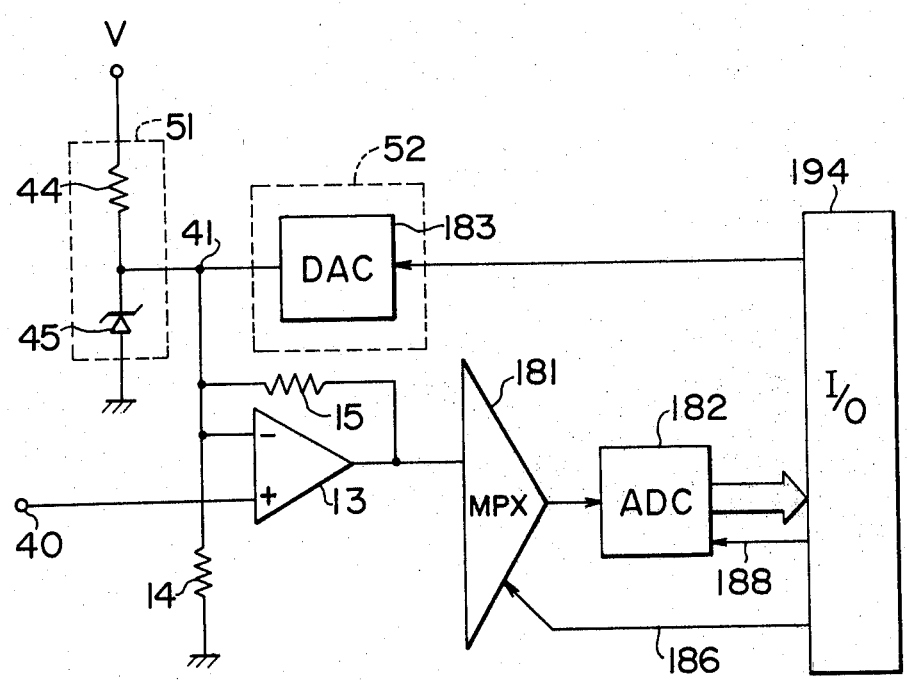
FIG. 15 shows a circuit diagram of the second and third examples of the output compensating circuit.

FIG. 15 shows a circuit diagram of a circuit to compensate the output voltage $e_o$ by using a known proper set voltage $V_R$. There are two ways to execute the compensation. One is that an output compensation circuit 51 including a series circuit with a resistor 44 and a Zener diode 45 is provided, a voltage $V_R$ across the Zener diode 45 is set to be a proper value and the set value is applied to the inverted input of the operational amplifier. This method will be described by using the flow chart shown in FIG. 16. As in the manner of the steps 300 to 315 shown in FIG. 7, steps 605, 610, 615 and 620 execute the A-D conversion of the output voltage $e_o$ of the operational amplifier 13 and load the result of the conversion into the I/O interface. At the next step 625, the digital value $x_o$ of the set voltage $V_R$ previously stored in the RAM therefrom is fetched. At a step 630, add data x to the set value $x_o$ and stores the sum, $x = x + x_o$, in the RAM.

On the basis of the compensating value x stored, the flow rate is performed.

The other method is that a proper digital value is applied through the I/O interface 194 to a digital-analog converter (DAC) 183 and an analog output signal from the converter 183 is applied as the voltage $V_R$ to the inverted input of the operational amplifier 13. This method will be described with reference to a flow chart shown in FIG. 16. Firstly, at a step 600, apply the digital setting value $x_o$ previously stored in the RAM to the D-A converter 183, through the I/O interface 194 and applies the analog output signal from the converter to the inverted input terminal of the operational amplifier 13 as the set voltage $V_R$. Then, through steps 605 to 620, the A-D converted value x of the output voltage $e_o$ of the operational amplifier 14 is determined and loaded into the I/O interface. At a final step 630, the data x loaded at the step 620 and the set value $x_o$ stored in the RAM are summed and the sum is stored in the RAM as flow rate data.

As described above, by obtaining an output voltage $e_o$ through the subtraction of a predetermined value from the input voltage $e_i$ to the operational amplifier 13, the ADC 182 uses all its dynamic range for the input data, so that the A-D converting result is fairly accurate.

The description thus far made relates only to a case where a hot-wire flow rate measuring apparatus according to the invention is used to measure the air flow rate of the internal combustion engine for an automobile. It is evident, however, that the apparatus according to the invention is applicable for other suitable apparatuses.

We claim:

1. A hot-wire flow rate measuring apparatus comprising:
a first series circuit including a first thermo-sensitive resistive element placed in the fluid path of fluid and a first resistive element,
a circuit for dividing the voltage across said first thermo-sensitive resistive element;
a second thermo-sensitive resistor for temperature compensation placed in the fluid path of fluid;
means for detecting the difference between the output voltage of said voltage dividing circuit and the output voltage of said second thermo-sensitive resistor for temperature compensation;
means for controlling current fed to said first series circuit in accordance with the detected voltage from said detecting means; and
output means for producing a voltage in accordance with the voltage across said resistive element, and wherein the output voltage of said output means indicates a flow rate of fluid, and further comprising
a second resistive element connected in series with said second thermo-sensitive resistive element to form a second series circuit therewith; and
means for controlling the voltage across said second series circuit so that the voltage across said first resistive element and the voltage across said second resistive element are equal to each other, and wherein the voltage across said second series circuit is applied to said detecting means as said output voltage across said thermo-sensitive resistive element for temperature compensation.

2. A hot-wire flow rate measuring apparatus according to claim 1, wherein the temperature coefficients of said first thermo-sensitive resistive element and said second thermo-sensitive resistive element are equal to each other.

3. A hot-wire flow rate measuring apparatus according to claim 1, wherein said voltage dividing circuit is comprised of serially connected resistors and said detecting means is an amplifier.

4. A hot-wire flow rate measuring apparatus according to claim 1, wherein said control means is an amplifier and said thermo-sensitive resistive element is inserted in the feedback circuit of said amplifier.

5. A hot-wire flow rate measuring apparatus according to claim 1, further comprising a constant voltage element connected at one end of said current feeding means, and wherein said output means includes an amplifier coupled at the non-inverted input terminal with said first resistive element, and at the inverted input terminal with the other terminal of said constant voltage element, and provides an output signal as said output voltage.

6. A hot-wire flow rate measuring apparatus comprising:
a first series circuit including a first thermo-sensitive resistive element placed in the fluid path of fluid and a first resistive element,
a circuit for dividing the voltage across said first thermo-sensitive resistive element;
a second thermo-sensitive resistor for temperature compensation placed in the fluid path of fluid;
means for detecting the difference between the output voltage of said voltage dividing circuit and the output voltage of said second thermo-sensitive resistor for temperature compensation;
means for controlling current fed to said first series circuit in accordance with the detected voltage from said detecting means; and
output means for producing a voltage in accordance with the voltage across said resistive element, and wherein the output voltage of said output means indicates a flow rate of fluid, and further comprising
a constant voltage supply means, said output means being an operational amplifier whose non-inverted and inverted inputs are connected to the connection point of said first series circuit and to said constant voltage supply means respectively, whereby the air flow rate is calculated by the data of sum of the outputs of said operational amplifier and said constant voltage supply means.

7. A hot-wire flow rate measuring apparatus comprising:
a first series circuit including a first thermo-sensitive resistive element placed in the fluid path of fluid and a first resistive element,
a circuit for dividing the voltage across said first thermo-sensitive resistive element;
a second thermo-sensitive resistor for temperature compensation placed in the fluid path of fluid;
means for detecting the difference between the output voltage of said voltage dividing circuit and the output voltage of said second thermo-sensitive resistor for temperature compensation;

means for controlling current fed to said first series circuit in accordance with the detected voltage from said detecting means; and output means for producing a voltage in accordance with the voltage across said resistive element, and wherein the output voltage of said output means indicates a flow rate of fluid, and further cpmprising a first operational amplifier whose non-inverted input is connected to the output of said voltage dividing circuit, and a second operational amplifier whose non-inverted input is connected to the output of said second thermo-sensitive resistive element, the inverted inputs of said first and second operational amplifiers being electrically connected to each other, and the outputs of said first and second operational amplifiers being connected to said detecting means.

8. A hot-wire flow rate measuring apparatus according to claim 7, wherein the inverted inputs of said first and second operational amplifiers are connected to each other through a parallel circuit of a resistor and a capacitor.

9. A hot-wire flow rate measuring apparatus comprising:

a first series circuit including a first thermo-sensitive resistive element and a first resistor element;

a second series circuit including a second thermo-sensitive resistive element and a second resistor element;

a first amplifier circuit having an input and an output; and a second amplifier circuit having an input and an output; and wherein an input of said second amplifier circuit is coupled to the output of said first amplifier circuit and the output of said second amplifier circuit is coupled to control the current supplied to said first series circuit, and one of said first and second series circuits is coupled to an input of said first amplifier circuit and the other of said first and second series circuits is coupled to an input of said second amplifier circuit.

10. A hot-wire flow rate measuring apparatus according to claim 9, wherein one end of said first thermo-sensitive resistive element is coupled to an input of said first amplifier circuit and one end of said second thermo-sensitive resistive element is coupled to an input of said second amplifier circuit.

11. An apparatus according to claim 9, wherein said first amplifier circuit has a first input coupled to the connection of said first thermo-sensitive resistive element and said first resistor element and a second input coupled to the connection of said second thermo-sensitive resistive element and said second resistor element.

12. An apparatus according to claim 11, wherein said first amplifier circuit has a non-inverted input coupled to the connection of said first thermo-sensitive element and said first resistor element and an inverted input coupled to the connection of said second thermo-sensitive resistive element and said second resistor element.

13. An apparatus according to claim 9, wherein one of said first and second thermo-sensitive resistive elements is adapted to measure fluid flow rate and the other of said first and second thermistor resistive elements is a temperature compensation resistive element.

14. An apparatus according to claim 13, wherein said first thermo-sensitive resistive element is adapted to measure fluid flow rate and said second thermo-sensitive resistive element is a temperature compensation resistive element.

15. An apparatus according to claim 14, wherein one end of said temperature compensation resistive element is coupled to an input of said first amplifier circuit.

16. An apparatus according to claim 15, wherein another end of said temperature compensation resistive element is coupled to an input of said second amplifier circuit.

17. An apparatus according to claim 9, further comprising a voltage divider circuit coupled in parallel with said first thermo-sensitive resistive element, and means for coupling the output of said voltage divider circuit to an input of said second amplifier circuit.

18. An apparatus according to claim 17, wherein said first thermo-sensitive resistive element is adapted to measure fluid flow rate and said second thermo-sensitive resistive element is a temperature compensation resistive element.

19. An apparatus according to claim 18, further comprising an output circuit having an input coupled to said first series circuit and an output from which an output signal representative of fluid flow rate is derived.

20. An apparatus according to claim 19, further comprising means, coupled to said first series circuit and said output circuit, for causing said output signal to indicate that the detected air flow rate is low in response to misoperation of said first thermo-sensitive resistive element.

21. A hot-wire flow rate measuring apparatus according to one of claims 9 and 17, wherein the resistance value of said second thermo-sensitive resistive element is considerably less than that of said second resistor element.

22. An apparatus according to claim 9, further including means, responsive to the output of said second amplifier circuit, for controlling the current supplied to said first series circuit.

23. An apparatus according to claim 22, further comprising activation means, coupled to an input of said second amplifier circuit and responsive to the application of power to said apparatus, for causing said control means to initiate the supply of current to said first series circuit.

24. An apparatus according to claim 23, wherein said activation means comprises means for imparting a bias imbalance to said second amplifier circuit in response to the application of power to said apparatus, whereby said second amplifier circuit couples an output to cause said control means to initiate the supply of current to said first series circuit.

25. An apparatus according to claim 24, wherein said activation means comprises means for removing said bias imbalance to said second amplifier circuit subsequent to the initiation of the supply of current to said first series circuit.

26. An apparatus according to claim 25, wherein said activation means comprises a diode bias circuit, coupled between a voltage supply source and an input of said second amplifier circuit.

27. An apparatus according to claim 9, wherein the temperature coefficients of said first and second thermo-sensitive resistive elements are equal to each other.

28. An apparatus according to claim 9, wherein one of said first and second thermo-sensitive resistive elements is coupled between an input and an output of one of said first and second amplifier circuits.

29. An apparatus according to claim 9, wherein said second thermo-sensitive resistive element is connected between the input and output of said first amplifier circuit.

30. An apparatus according to claim 9, further comprising an output circuit having an input coupled to said first series circuit and an output from which an output signal representative of fluid flow rate is derived.

31. An apparatus according to claim 30, wherein said apparatus further comprises processing means responsive to said output signal representative of fluid flow rate, for calculating the flow rate of fluid passing over one of said thermo-sensitive resistive elements in accordance with a prescribed algebraic relationship between said output signal and fluid flow rate.

32. An apparatus according to claim 30, wherein said apparatus further comprises processing means, responsive to said output signal representative of fluid flow rate, for selectively accessing a flow rate conversion table stored therein, in accordance with the value of said output signal, for deriving therefrom flow rate conversion data, and calculating the flow rate of fluid passing over one of said thermo-sensitive resistive elements in accordance with said output signal and said flow rate conversion data.

33. An apparatus according to claim 30, wherein said apparatus further comprises analog-digital conversion means for converting said output signal representative of fluid flow rate into digital data and processing means, responsive to the digital data produced by said analog-digital conversion means, for calculating the flow rate of fluid passing over one of said thermo-sensitive resistive elements in accordance with said digital data.

34. An apparatus according to claim 33, wherein said apparatus further comprises means for causing the output signal of said output means to be modified by an amount to enable the conversion range of said analog-digital conversion means to cover the maximum possible output value of measured fluid flow rate.

35. An apparatus according to claim 33, wherein said apparatus further comprises means for causing the output signal of said output means to be modified by an amount to enable the conversion range of said analog-digital conversion means to correspondingly cover the range of variation of the level of said output signal.

36. An apparatus according to claim 35, wherein said output means comprises a third amplifier circuit having a first input coupled to one of said thermo-sensitive resistive elements and a second input coupled to receive an offset voltage, and an output from which said output signal is derived.

37. An apparatus according to claim 36, wherein said modification causing means comprises means for applying a fixed offset voltage to said second input of said third amplifier circuit.

38. An apparatus according to claim 36, wherein said modification means comprises means for applying a controllable offset voltage to said second input of said third amplifier circuit.

39. An apparatus according to claim 38, wherein said processing means includes means for calculating said controllable offset voltage to be applied to said second input of said third amplifier circuit.

* * * * *